(12) United States Patent
Laudereau et al.

(10) Patent No.: US 12,390,883 B2
(45) Date of Patent: Aug. 19, 2025

(54) ETCHING OF COATED SUBSTRATE

(71) Applicant: SAINT-GOBAIN GLASS FRANCE, Courbevoie (FR)

(72) Inventors: Jean-Baptiste Laudereau, Paris (FR); Daniele Costantini, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 346 days.

(21) Appl. No.: 17/787,081

(22) PCT Filed: Dec. 18, 2020

(86) PCT No.: PCT/FR2020/052569
§ 371 (c)(1),
(2) Date: Jun. 17, 2022

(87) PCT Pub. No.: WO2021/123690
PCT Pub. Date: Jun. 24, 2021

(65) Prior Publication Data
US 2023/0045271 A1  Feb. 9, 2023

(30) Foreign Application Priority Data

Dec. 20, 2019  (FR) ...................................... 1915197

(51) Int. Cl.
*B23K 26/352* (2014.01)
*B23K 26/08* (2014.01)
(Continued)

(52) U.S. Cl.
CPC ........ *B23K 26/355* (2018.08); *B23K 26/0846* (2013.01); *B23K 26/362* (2013.01); *B23K 2101/34* (2018.08)

(58) Field of Classification Search
CPC ............ B23K 2101/34; B23K 2103/42; B23K 2103/54; B23K 26/0006; B23K 26/082;
(Continued)

(56) References Cited

U.S. PATENT DOCUMENTS 4,956,539 A * 9/1990 Uesugi ............... B23K 26/0846
219/121.85
2009/0233397 A1 * 9/2009 Psyk .................. B23K 26/0846
219/121.68
(Continued)

FOREIGN PATENT DOCUMENTS

DE  10 2014 014889 A1  4/2016
WO  WO-2010086865 A1 * 8/2010 ........... B23K 26/082

OTHER PUBLICATIONS

International Search Report as issued in International Patent Application No. PCT/FR2020/052569, dated May 6, 2021.

*Primary Examiner* — Xiao S Zhao
*Assistant Examiner* — Victoria Bartlett
(74) *Attorney, Agent, or Firm* — Pillsbury Winthrop Shaw Pittman LLP

(57) ABSTRACT

A method for treating a coating on a scrolling substrate by a treatment unit generating a laser beam, the method including producing a pattern including several lines or portions extending in the scrolling direction and/or the direction orthogonal to the scrolling direction, the pattern being repeated to cover treat the surface of the substrate.

15 Claims, 8 Drawing Sheets

(51) Int. Cl.
 *B23K 26/362* (2014.01)
 *B23K 101/34* (2006.01)
(58) Field of Classification Search
 CPC .............. B23K 26/0846; B23K 26/355; B23K 26/362; B23K 26/402; C03C 17/40; C03C 2218/328
 See application file for complete search history.

(56) References Cited

U.S. PATENT DOCUMENTS

2009/0266804 A1   10/2009  Costin et al.
2012/0003788 A1*  1/2012  Harley .................... H01L 31/18
 257/E31.11
2014/0059878 A1   3/2014  Bilaine et al.
2015/0290740 A1  10/2015  Yeh
2017/0216965 A1*  8/2017  Otsuki ................ B23K 26/035

* cited by examiner

[Fig. 1a]
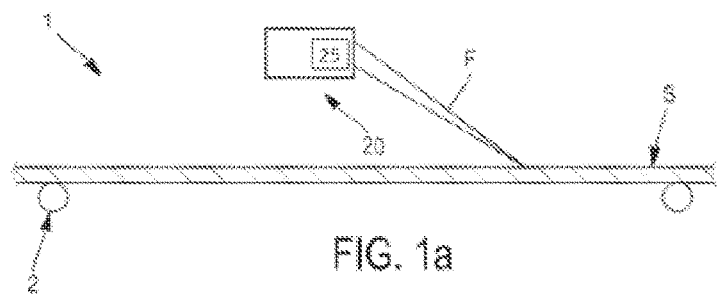
FIG. 1a
[Fig. 1b]
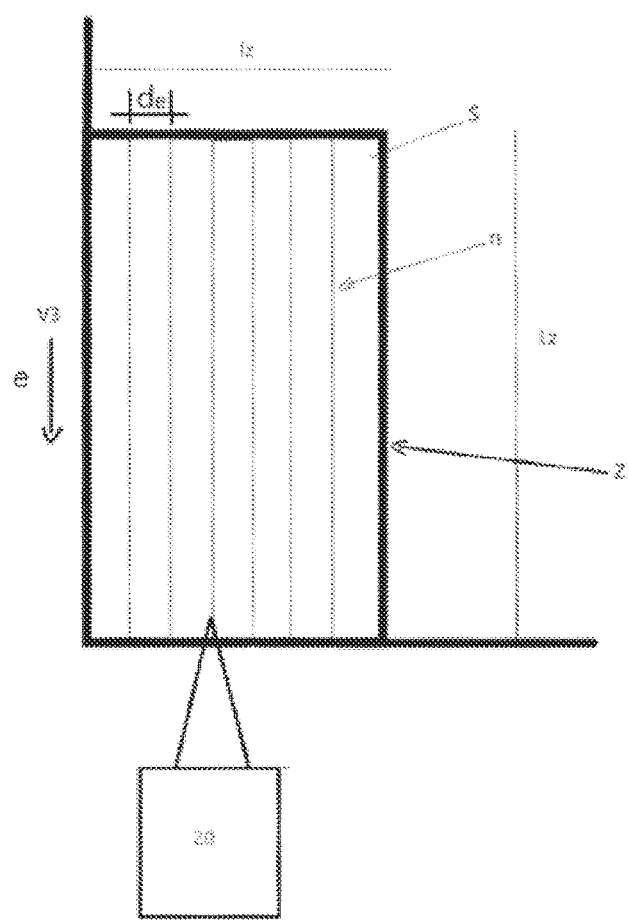

[Fig. 1c]
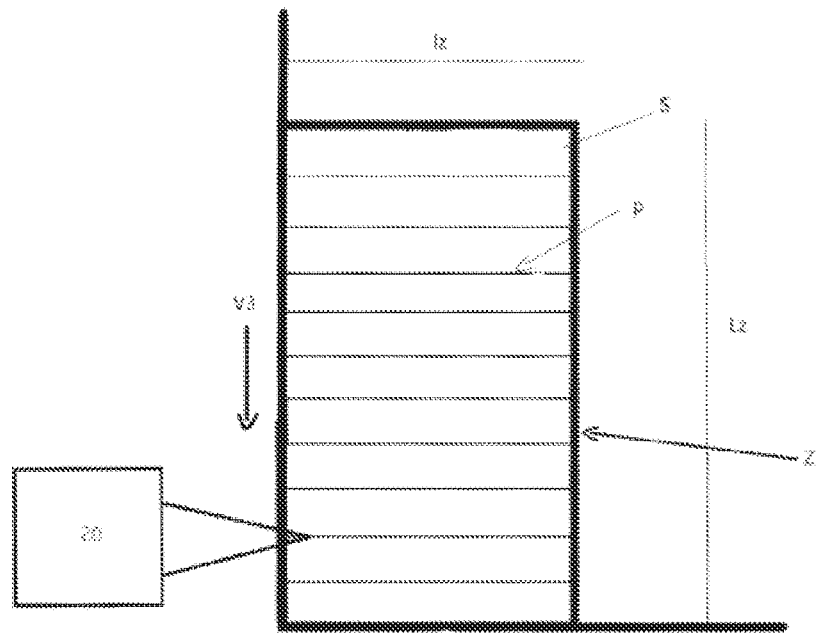
[Fig. 2]
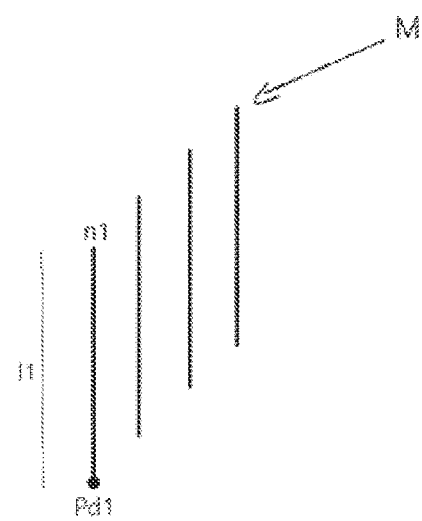

[Fig. 3]
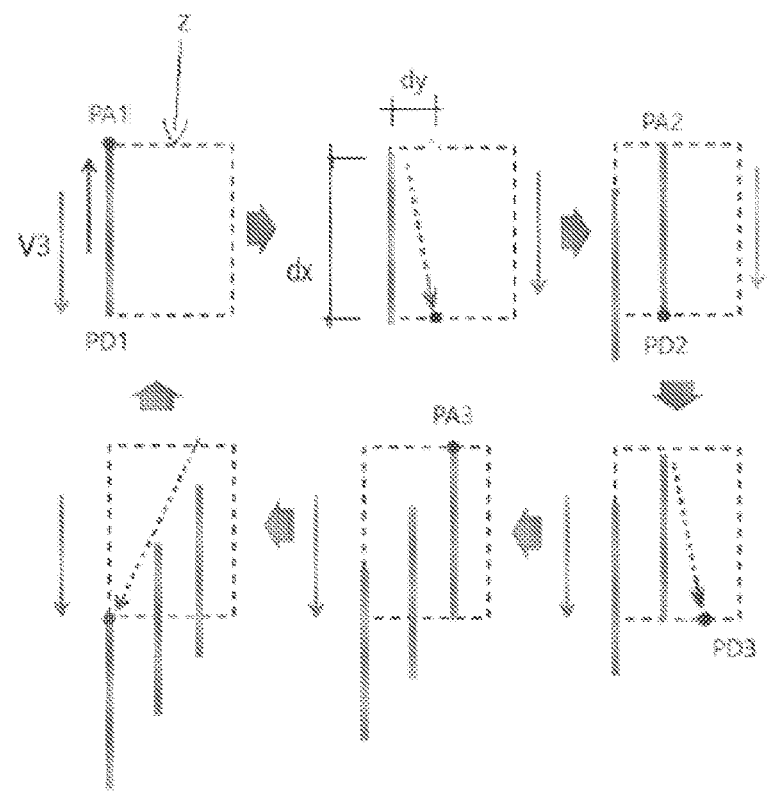
[Fig. 4]
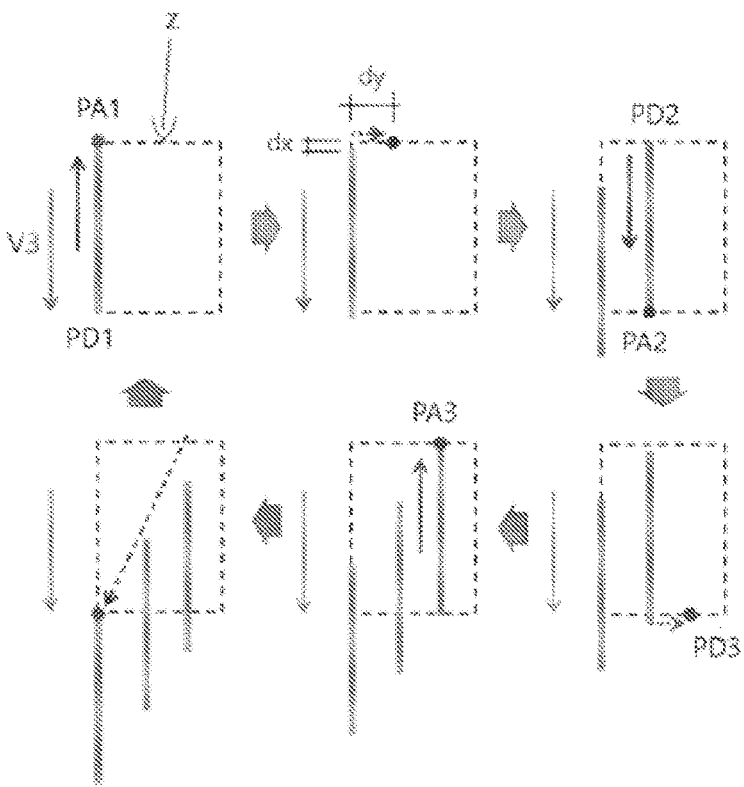

[Fig. 5a]
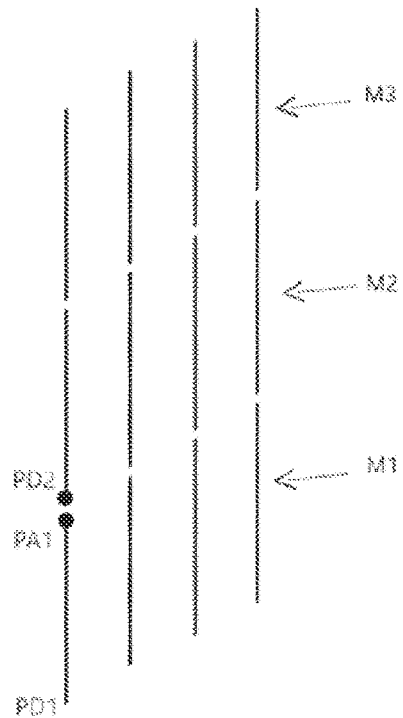
[Fig. 5b]
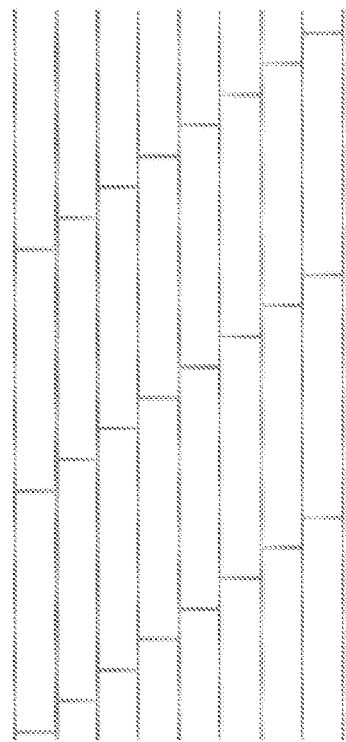

[Fig. 6]
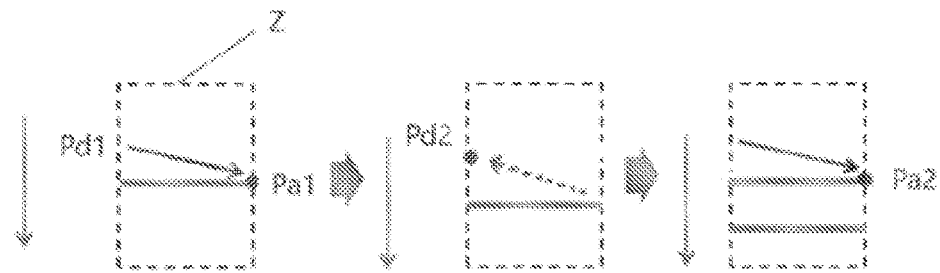
[Fig. 7]
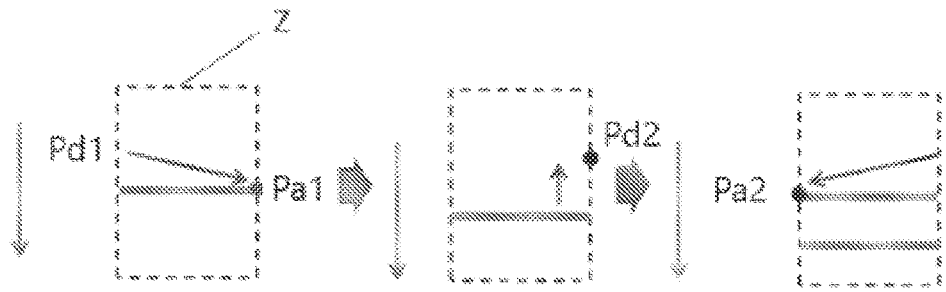
[Fig. 8]
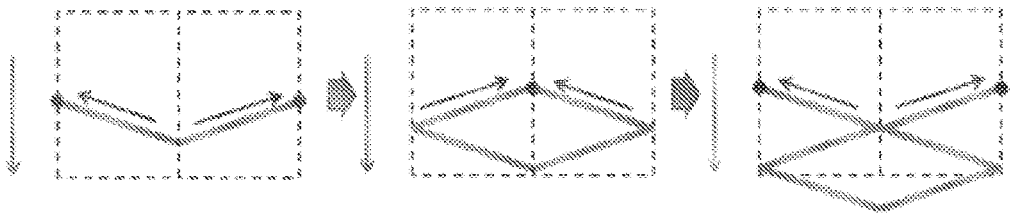

[Fig. 9]
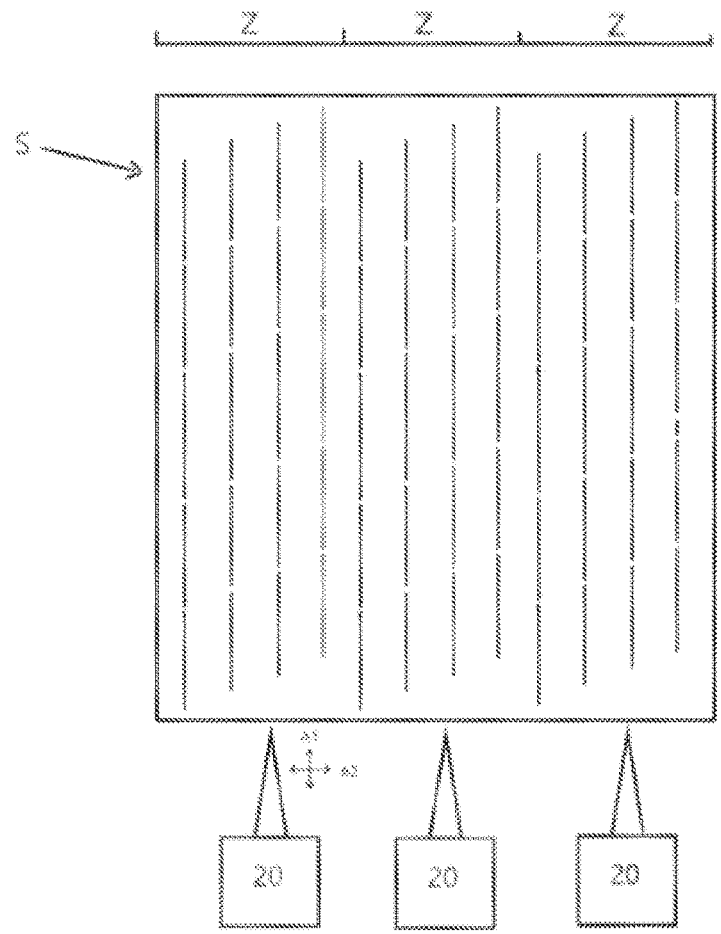
[Fig. 10]
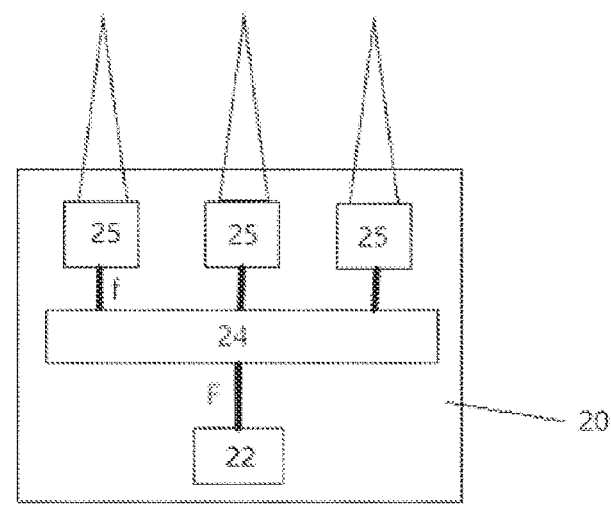

[Fig. 11]
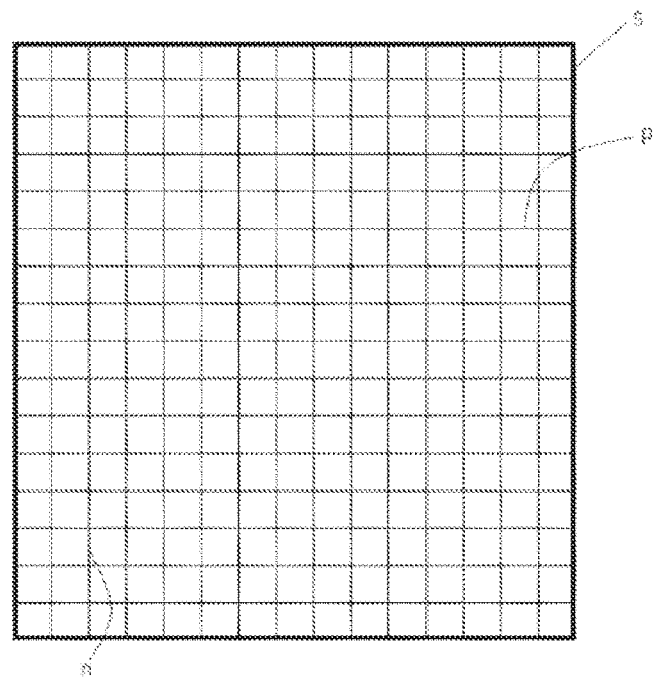
[Fig. 12]
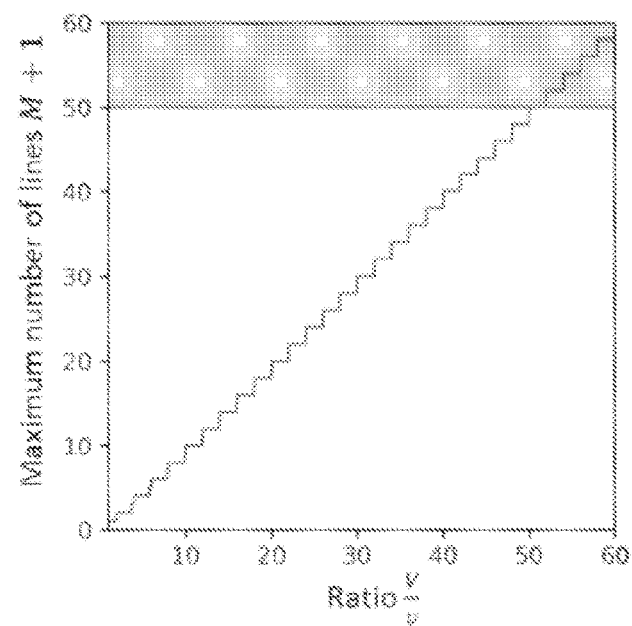

[Fig. 13]
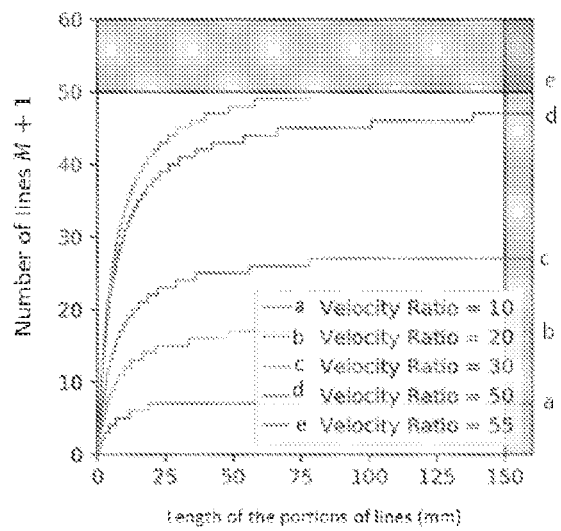
[Fig. 14]
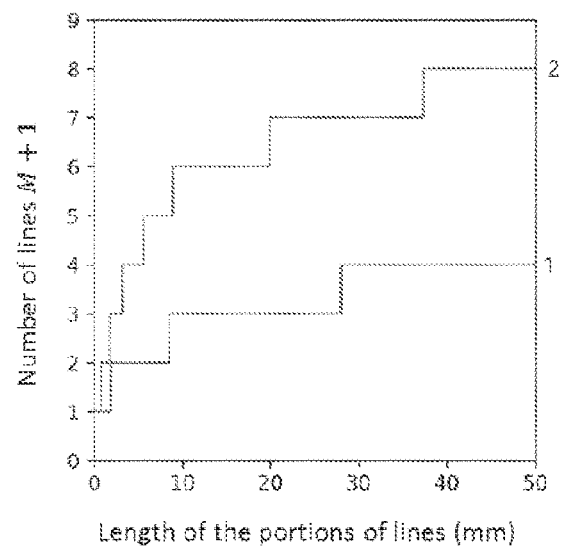

ETCHING OF COATED SUBSTRATE

CROSS-REFERENCE TO RELATED APPLICATIONS

This application is the U.S. National Stage of PCT/FR2020/052569, filed Dec. 18, 2020, which in turn claims priority to French patent application number 1915197 filed Dec. 20, 2019. The content of these applications are incorporated herein by reference in their entireties.

The present invention relates to the field of the etching of a coating deposited on a substrate.

PRIOR ART

Currently, it is known practice to use lasers in the context of glass-making methods in order to do coating heat treatment. In this case, one or more laser beams are used to form a line making it possible to heat treat a substrate. It is also known practice to use a laser to do substrate etching, notably to make a marking. In this case, a laser beam is focused on the substrate to etch it. This etching can be used in the context of identification.

There is also another application for laser etching in the field of glass-making substrates. This application relates to the etching of metallic coatings for signal transmission applications. In fact, the coatings comprising an overlay of a notably metallic layer act how shields preventing the good circulation of the radiofrequency signals. Now, these radiofrequency signals have become very popular because they make it possible to transport a large quantity of information such as for entertainment but also useful contents such as navigation or telecommunications.

It is therefore becoming necessary to ensure that the glass-making substrates do not form an obstacle to the transmission of data via radiofrequency signals and for that, one solution consists in reducing the shield effect of the metallic coatings. This reduction is obtained by laser etching. This laser etching consists in locally etching the coating to reduce the shield effect.

Now, these days, it is necessary to find a method that makes it possible to treat a coated substrate at an industrial rate.

SUMMARY OF THE INVENTION

The present invention therefore proposes to resolve these drawbacks by providing an etching method that makes it possible to etch the coating of a substrate according to a defined pattern efficiently.

For that, the invention consists of a method for etching a pattern on a coating deposited on a substrate, said substrate scrolling at a velocity V3, said pattern being produced by a treatment unit generating a laser beam in the form of an etching point capable of being moved in the scrolling direction with an amplitude A1 at a velocity V1 greater than V3 over at least one line portion and in a direction orthogonal to the scrolling direction with an amplitude A2 at a velocity V2 over at least one line portion. Said method comprising the following steps:
  etching a first line p1 of a length l1 between an etching start point PD1 and an etching end point PA1;
  performing at least one etching of another line (n), this etching consisting in:
  a moving the beam from the etching end point PAi to an etching start point PDi+1, said etching start point PDi+1 being offset from the etching end point PAn by a distance dx in the scrolling direction and by a distance dy in a direction orthogonal to the scrolling direction;
  etching a line i+1 of a length l1 between said etching start point PDi+1 and an etching end point PAi+1;
  moving the beam of the etching point from the etching end point PAi+x to the etching end point PA1.

According to one example, the lines of the pattern are etched in the same direction from upstream of the substrate to downstream or vice versa.

According to one example, the movement of the beam from the etching end point PAi to an etching start point PDi+1 is obtained by a movement in the scrolling direction and a movement in a direction orthogonal to the scrolling direction.

According to one example, the lines of the pattern are alternately etched in the direction from upstream of the substrate to downstream or vice versa.

According to one example, the movement of the beam from the etching end point PAi to an etching start point PDi+1 consists of a movement in a direction orthogonal to the scrolling direction, the offset by a distance dx being obtained by scrolling the substrate.

The invention relates also to a method for etching a coating deposited on a substrate, characterized in that it comprises the following steps:
  obtaining a coated substrate and making it scroll at a velocity V3;
  producing a first pattern M1 by using the method as according to the method for etching a pattern of the invention, the first pattern having a first line p1 of a length l1 between an etching start point PD1 and an etching end point PA1;
  repeating the step of production of a pattern Mi so that the etching start point PDi of the first line n1 of the next pattern coincides with the etching end point PAi of the first line of the preceding pattern.

The invention relates also to a method for etching a coating deposited on a substrate, said substrate scrolling at a velocity V3, said pattern being produced by a treatment unit generating a laser beam in the form of an etching point capable of being moved in the scrolling direction with an amplitude A1 at a velocity V1 and in a direction orthogonal to the scrolling direction with an amplitude A2 at a velocity V2, said method comprising the following steps:
  obtaining a coated substrate and making it scroll at a velocity V3;
  performing an etching of a portion pj of a length l1 between an etching start point (Pdj) and an etching end point Paj, the velocity and the angle of movement of the etching point making it possible to obtain a first rectilinear portion at right angles to the direction of movement;
  at least once, applying the sequence consisting in:
  performing a placement step in which the etching point is positioned at the etching start point Pdj+1 of the next portion pj+1 to be etched;
  performing the etching of said next portion pj+1 of a length l1 between the etching start point Pdj+1 and an etching end point Paj+1, the velocity and the angle of movement of the etching point allowing said next portion pj+1 to be parallel to the preceding portion pj.

According to one example, said coating is treated to be etched in the scrolling direction by the method for etching a coating according to the invention and/or be etched in a direction orthogonal to the scrolling direction by the method for treating a coating according to the invention.

According to one example, said substrate is divided into a plurality of zones each extending over all the length of the substrate in the scrolling direction, these zones being parallel to one another, the coating of each zone being treated in parallel.

According to one example, the etching in the scrolling direction of several zones uses a treatment unit capable of generating a number of beams equal to the number of zones to be treated and/or the etching in the direction orthogonal to the scrolling direction of several zones uses a treatment unit capable of generating a number of beams equal to the number of zones to be treated.

According to one example, the treatment unit allows each beam to be moved on the surface of the substrate, in the scrolling direction and/or the direction orthogonal to the scrolling direction, at a velocity greater than 1.5 m/s, preferentially greater than 10 m/s, more preferentially greater than 20 m/s.

According to one example, the ratio of the velocities between the velocity of movement V3 of the substrate and the velocity V1, V2 in the scrolling direction and/or the direction orthogonal to the scrolling direction is greater than 10, preferentially greater than 50.

According to one example, the etching perimeter of each treatment unit has an amplitude A1 greater than 100 mm, preferentially greater than 150 mm.

According to one example, the etching perimeter of each treatment unit has an amplitude A2 greater than 100 mm, preferentially greater than 150 mm.

According to one example, the method is capable of treating a zone of a width greater than 1 m, preferably 1.5 m and even more preferably 3 m.

The invention relates also to a substrate on which a coating is deposited, characterized in that said coating is treated by the etching method according to the invention.

According to one example, said substrate is glass.

According to one example, said substrate is a polymer.

According to one example, the coating is metallic.

DESCRIPTION OF THE FIGURES

Other particular features and advantages will clearly emerge from the description given hereinbelow, in an indicative and nonlimiting manner, with reference to the attached drawings, in which:

FIGS. 1a to 1c are schematic representations of treatment of a substrate in two different directions;

FIG. 2 is a schematic representation of a pattern to be etched according to a first embodiment of the invention;

FIGS. 3 and 4 are schematic representations of two cycles of steps making it possible to obtain the pattern to be etched a first embodiment of according to the invention;

FIGS. 5a and 5b are schematic representations of several associated patterns according to a first embodiment of according to the invention;

FIGS. 6, 7 and 8 are schematic representations of two cycles of steps making it possible to obtain a pattern to be etched a second embodiment of according to the invention;

FIG. 9 is a schematic representation of a substrate treated according to the first embodiment of the invention, with several contiguous zones;

FIG. 10 is a schematic representation of an alternative treatment unit;

FIG. 11 is a schematic representation of a substrate treated according to the first embodiment and the second embodiment according to the invention;

FIGS. 12 to 14 are diagrams relating to the number of lines that can be produced.

DETAILED DESCRIPTION OF THE INVENTION

A laser treatment device 1 comprises movement means 2 for conveying a substrate S as can be seen in FIG. 1a. This substrate S is a substrate of glass type or of polymer type, transparent or not, on which a coating is deposited. This coating may or may not be metallic. This substrate is, preferably, a substrate of large size of at least 1.5 m width l and 2 m length L, preferably 3 m wide and 6 m long. This coating comprises at least one layer of a metallic material.

The velocity of movement V3 is at least 3 m/min, preferentially at least 5 m/min. even 10 m/min.

The laser treatment device 1 further comprises a treatment unit 20 for treating the surface of the coating. Surface treatment is understood to mean methods for modifying the material affecting depths lower than 10% of the thickness of the treated product. In a non-exhaustive manner, the surface treatment can comprise, for example, ablation, annealing, marking, texturing, or a chemical reaction.

This treatment unit 20 is used to etch, with a pattern, the coating locally over a zone Z of width lz and of length Lz. Ideally, the width lz is equal to the width l of the substrate and the length Lz is equal to the length L of the substrate.

This treatment unit 20 comprises a laser source 22 generating a primary beam F of energy E. The beam F has the form of a point, that is to say that its surface area is less than 31 000 $\mu m^2$ and/or its form has cylindrical symmetry. The laser beam F supplied has a diameter d and a repeat rate r such that two successive pulses overlap over at least a portion of their surface area. The beam F passes through a scanning element 25 allowing the laser beam to be moved over the substrate to be treated at at least a velocity V1 greater than the velocity V3. The scanning element 25 is designed to allow said beam to be moved in a direction parallel to the scrolling direction and in a direction orthogonal to the scrolling direction. The scanning element 25 allows an amplitude A1 of the beam in the scrolling direction at a velocity V1 and an amplitude A2 of the beam in a direction orthogonal to the scrolling direction at a velocity V2, the velocities V1 and V2 being able to be equal or not, or variable or constant. For example, these velocities are greater than 1.5 m/s, preferentially greater than 10 m/s, more preferentially greater than 20 m/s and the amplitudes A1 and A2 are greater than 100 mm, preferentially greater than 150 mm.

According to the invention, the scanning element 25 is used to treat a coating on a substrate S.

In a first embodiment, the scanning element 25 makes it possible to treat the substrate S in the scrolling direction as can be seen in FIG. 1b. For that, the first embodiment consists in producing a pattern M which is repeated to obtain the treatment of the zone Z to be treated. The scanning element 25 is then used to perform a method for etching a pattern. This pattern M comprises a plurality of lines n as can be seen in FIG. 2, the lines n being spaced apart by a distance $d_e$.

This method for etching a pattern M, that can be seen in FIGS. 3 and 4, comprises a first step consisting in performing the etching of a first line n1. This first line n1 comprises a start point PD1 and an end point PA1. This first line has a length l1 and has a form f1. This form is preferentially rectilinear, parallel to the scrolling direction, but can also be curved or rippled.

A second step consists in etching at least one other line ni. This other line also comprises a start point PDi and an end point PAi, a length li and has a form fi. The form fi and the length li is identical to the length l1 and the form f1 of the first line.

This second step of etching of a line ni is performed by applying substeps.

A first substep consists in moving the beam from the etching end point PAi−1 to the etching start point PDi at a velocity V1, V2, said etching start point PDi being offset from the etching end point Pai−1 by a distance dx in the scrolling direction e and a distance dy in a direction orthogonal to the scrolling direction, Thus, the etching of a line other than the first line n1, for example a second line n2, consists in moving the laser beam from the end point PA1 to the start point PD2, this point PD2 being offset in the scrolling direction and in the direction orthogonal to said scrolling direction with respect to the end point PA1.

A second substep consists in etching the line ni by a length li between said etching start point PDi and an etching end point PAi.

This second step is repeated a plurality of times making it possible to produce the pattern M with n lines.

This second step can be performed in several different ways. These ways relate to the movements applied to perform the offset and the etching. This movement can be applied in a rectilinear or curved manner and may or may not be associated with an etching.

In a first way that can be seen in FIG. 3, the etching lines of the pattern M are produced such that the end points PAi are all situated upstream of the substrate with respect to the start points PDi. In these cases, the etching consists in a movement from downstream to upstream.

According to this first way, the offset between said etching start point PDi and the etching end point PAi is done by a movement by a distance dx in the scrolling direction and by a movement by a distance dy in a direction orthogonal to the scrolling direction.

Preferentially, the etching start point PDi is located upstream with respect to the etching start point PDi−1. Thus, the start point PDi is offset by a distance de from the start point PDi−1.

In a second way that can be seen in FIG. 4, the etching lines n of the pattern M are produced so as to have an alternation in the upstream-downstream direction of etching. It is thus understood that, when the etching of a line ni is done from downstream to upstream, the etching of the line ni+1 is done via a movement from upstream to downstream and vice versa. Consequently, the etching points situated upstream of the substrate consist of an alternation of end points PA and of start points PD, and vice versa for the etching points situated downstream.

This way advantageously makes it possible to limit the movements necessary between the end points ni and the start points ni+1. In this example, it may be advantageous to use a different scanning speed depending on whether the direction is from downstream to upstream or from upstream to downstream. For example, using a velocity V2a=V2−V3 when going from downstream to upstream and a velocity V2b=V2+V3 when going from upstream to downstream. That done, the laser point is always moved at the same velocity relative to the substrate when scrolling at the velocity V3. That makes it possible to guarantee a uniform treatment regardless of the direction of etching.

Indeed, in the case illustrated in FIG. 3, the path covered by the laser point with identical number of lines n is longer than in the case illustrated in FIG. 4 because the point must always return downstream between a line ni and a line ni+1. The etching of the pattern M is therefore longer, which limits the maximum scrolling speed authorized for the substrate. The case illustrated in FIG. 4 advantageously makes it possible to reduce the travel time and simplify the setpoint sent to the scanning modules.

A third step of the method for etching the pattern M consists in controlling the laser device so that the beam is moved from the etching point of the etching end point PAn+x of the last line nx to the etching end point Pa1 of the first line n1.

It will be understood that the etching can be, also, applied during the movement between the end point PAi−1 of the line ni−1 and the start point PDi of the line ni. The pattern of FIG. 5b is obtained.

Thus, the method for treating a coating deposited on a substrate comprises different steps consisting in producing a succession of patterns Mi as can be seen in FIG. 5a.

A first step of this method for treating a coating consists in obtaining a coated substrate and making it scroll at a velocity V3.

A second step consists in producing a first pattern M1 by using the method for etching the pattern M explained previously. The first pattern M1 has a first rectilinear line n1 of a length l1 between an etching start point PD1 and an etching end point PA1.

A third step consists in repeating the step of production of a pattern M. Thus, this third step consists in repeating the etching of the pattern M so that the etching start point PD1 of the first line n1 of the pattern Mi+1 substantially coincides with the etching end point PA1 of the first line of the pattern Mi. It will therefore be understood that the etching start point PD1 of the first line of the pattern Mi+1 and the etching end point PA1 of the first line of the pattern Mi are considered to coincide if the distance between them is less than two times the size of the point, preferably less than the size of the point, or if it is less than the pitch of 1 mm.

This arrangement of the patterns M thus allows for a relative continuity of the lines n of the different patterns between them to perform an etching over the length of the substrate, or, failing real continuity, this arrangement allows anyone looking at the product from more than a meter away not to see any discontinuity.

The number of lines n that can be produced for a pattern M depends on the scrolling velocity, on the laser device and on the pattern M itself. Indeed; there are two invariable data, namely the scrolling velocity and the amplitudes A1, A2 of the scanning element. Now, the laser beam needs to be able to be moved, for each pattern, from the etching point of the etching end point PAi+x of the last line nx to the etching end point PA1 of the first line n1 before the latter has left the field A1, A2 of the scanning element.

Now, the number of lines n in a direction orthogonal to the scrolling direction depends on the separation between the lines which is equal to the distance dy.

Regarding the amplitude A1, it is necessary for the time taken by the point to etch X lines n and return to the end point PA1 of the line n1 of the preceding pattern Mi−1 to be less than the time taken by the substrate to cover l1. It is impossible to etch lines from upstream to downstream whose length l1 is greater than A1.

Furthermore, the number of lines that can be etched is less than the amplitude A2 divided by the pitch $d_e$ between two lines plus $1 = A2/d_e + 1$.

The scanning velocity and the length l1 of the line are also parameters to be taken into account.

The higher the scanning velocity, the more distance the beam covers in a given time. Now, increasing the distance covered makes it possible, within a defined time, to produce more lines.

Likewise, the length of the line has an important impact on the number of possible lines. Effectively, if the length of the line increases, then, for a given scanning velocity and a defined time, more lines can be produced, inasmuch as the point is moved more quickly than the substrate.

After analysis, two diagrams, that can be seen in FIGS. 12 and 13, are produced on the number of possible lines as a function of the ratio between the scanning velocity (denoted V) and the scrolling velocity (denoted v) (FIG. 5) or as a function of the length of the line etched for different values of this ratio (FIG. 6). These diagrams are produced for a separation between two lines of 3 mm and an amplitude a1, a2 of 150 mm.

These diagrams show that the more the ratio between the scanning velocity and the scrolling velocity increases, the more the number N of lines per pattern M increases. Moreover, it has been observed that, with the variation of the length t1 of the line, there is a limit beyond which saturation occurs, that is to say that it is no longer possible to increase the number of lines.

FIG. 14 shows a curve of the number of lines as a function of the length of the line with a curve 1 for a glass substrate 3 m wide and a scrolling velocity of 10 m/min and a curve 2 for a plastic substrate 1.5 m wide and a scrolling velocity of 20 m/min. If the length of the line increases then the distance to be traveled by the beam to etch a line and be moved to the etching start position of the next line is also likely to increase. If the scanning velocity or velocities V1, V2 are greater than the scrolling velocity V3 of the substrate S, the scanning can then potentially take enough of a lead on the substrate to etch more lines, within the limit of the amplitude al of the perimeter.

In an exemplary embodiment of the invention, the scanning means are such that the scanning velocity lies between 1.5 and 30 m/s, the length of the line varies between 10 and 50 mm and the ratio between the scanning velocity and the scrolling velocity is at least 10, preferably 20 and even more preferably 50. That makes it possible to have a treatment device which treats between 3 and 10 $m^2$ per minute.

In a particular example, with a laser developing an energy of 600 µJ on a coating comprise a stack provided with two silver-based layers on a glass substrate 3 m wide scrolling at 10 m/min, the coating requiring an energy of 4 µJ to be etched, it is possible to obtain, fora velocity of movement of the optical block of 20 m/s over an amplitude a1, a2 of 150 mm, a grid of 3 mm side, each optical block into which a laser beam enters being able to generate 8 parallel lines. In this precise case, 7 treatment modules 20 will have to be used.

For a same coating on a plastic substrate having a width of 1.5 m and scrolling at 20 m/min, the energy necessary for the treatment requires 3 µJ, each optical block into which a laser beam enters being able to generate 4 parallel lines. In this precise case, 4 treatment modules 20 will have to be used.

In a second embodiment that can be seen in FIG. 1c, the scanning element allows the substrate to be treated in the direction orthogonal to the scrolling direction.

Thus, the second embodiment relates to a method for etching, in the direction orthogonal to the scrolling direction, a coating deposited on a substrate scrolling at a velocity V3. The etching method comprises various steps.

The first step consists in obtaining a coated substrate and making it scroll at a velocity V3.

The second step consists in performing an etching of a portion pj of a length L1 between an etching start point (Pdj) and an etching end point (Paj) and of form fj. This portion is produced by moving the laser beam with a velocity and an angle of movement of the etching point that makes it possible to obtain a first rectilinear portion at right angles to the direction of movement.

In a third step, parallel portions are produced. For that, a sequence is repeated, the sequence comprises various substeps making it possible to switch from a portion pj to a portion pj+1.

A first substep consists in performing a placement step. This placement consists in positioning the laser beam at the etching start point Pdj+1 of the next portion pj+1 to be etched. For that, several solutions are envisaged.

A first solution, that can be seen in FIG. 6, consists in moving the laser beam in the scrolling direction and in the direction orthogonal to the scrolling direction to reach the etching start point Pdj+1 of the portion pj+1. In this case, the start points Pd of each portion p are all located on the same side of the substrate.

A second solution, that can be seen in FIG. 7, consists in moving the laser beam in the scrolling direction to reach the etching start point Pdj+1 of the portion pj+1. In this case, the start points Pd of each portion p are not all located on the same side of the substrate. There is, on one side of the substrate, an alternation of start points Pd and of end points Pa.

A third solution consists in using the scrolling of the substrate as means for applying the movement in the scrolling direction. It is therefore sufficient to leave the beam at the etching end point Paj and wait.

A second substep consists in performing the etching of said next portion pj+1 of a length Li between the etching start point Pdj+1 and an etching end point Paj+1. For that, the laser beam is moved with a velocity and an angle of movement of the etching point allowing said next portion pi+1 to be parallel to the preceding portion pi.

In the case of the first solution, the movement of the beam during the etching of the portion pj+1 is identical to that used to etch the portion pi.

In the case of the second or third solution for the movement to reach the etching start point Pdj+1, the movement of the beam during the etching of the portion pj+1 is symmetrical to the movement performed during the etching of the portion pj with respect to an axis parallel to the scrolling direction. Thus, the velocity and the angle of movement of the etching point make it possible to obtain a rectilinear portion at right angles to the direction of movement and are identical but the direction is different left-right/right-left.

In this second embodiment, it is possible for the treatments of two zones Z that are contiguous widthwise on the substrate S to be such that the patterns M of these two zones Z complement one another. For example, in the case where the pattern is such that the portions are not etched orthogonally to the scrolling direction to obtain oblique portions, the patterns of two contiguous zones Z can be produced to form, ultimately, a rhombus as can be seen in FIG. 8.

In a variant that can be seen in FIGS. 9 and 10, it is observed that, in the case of the first embodiment and of the second embodiment, the method described makes it possible to treat the coating over a zone of the substrate, lines in the scrolling direction for the first embodiment and lines orthogonal to the scrolling direction for the second embodiment. Now, this zone does not extend over all the width of the substrate. Consequently, to treat all the substrate, a multitude of treatment units 20 installed in parallel are used. In this case, the treatment unit 20 generates this multitude of beams f by a laser source generating the primary beam F coupled to a splitter 24 making it possible to generate this plurality of secondary beams, these secondary beams are coupled to a scanning element 25 allowing movement by an amplitude A1 in the scrolling direction and by an amplitude A2 in a direction orthogonal to the scrolling direction as can be seen in FIG. 10.

In another variant, the laser treatment device is arranged to allow the treatment of a coating on a substrate to etch lines in the scrolling direction using the method of the first embodiment and lines orthogonal to the scrolling direction using the method of the second embodiment. This variant advantageously makes it possible to etch a grid on said coating as can be seen in FIG. 11.

Obviously, the present invention is not limited to the example illustrated but lends itself to miscellaneous variants and modifications which will be apparent to the person skilled in the art.

Indeed, in the first embodiment, there is an offset in the scrolling direction between each line of one and the same pattern. Thus, for the first etched pattern, there is the risk of the start of the substrate not being etched evenly over its width. To compensate, it is possible to envisage having the etching process launched in such a way that the start point of the last line of the first pattern is situated on the edge of the substrate.

It is possible to etch diagonal or wavy lines and avoid this problem by slightly offsetting the start point Pd1 of the pattern Mn+1 or Mi+1 (depending on the direction) in order to ensure that the lines intersect somewhere. It is possible to continue the etching during the movement dx, dy between the end point Pa and the next start point Pd.

The invention claimed is:

1. A method for etching a pattern on a coating deposited on a substrate, said substrate scrolling at a scrolling velocity, said pattern being produced by a treatment unit generating a laser beam in the form of an etching point capable of being moved in a scrolling direction with a first amplitude at a first velocity greater than the scrolling velocity over at least one line portion and in a direction orthogonal to the scrolling direction with a second amplitude at a second velocity over at least one line portion, said method comprising, during the scrolling of the substrate: etching a first line of a length between and a first etching start point (PD1) and a first etching end point (PA1);performing at least one etching of another line (ni+1), said at least one etching consisting in: moving the laser beam from an etching end point (PAi) of a previously etched line (ni) that extends along the scrolling direction to an etching start point (PDi+1), said etching start point (PDi+1) of said other line (ni+1) being offset from the etching end point (PAi) of said previously etched line (ni) by a distance (dx) in the scrolling direction and by a distance (dy) in the direction orthogonal to the scrolling direction, etching said other line (ni+1) of a length between said etching start point (PDi+1) and an etching end point (PAi+1); moving the beam from the etching end point (PAi+1) to the first etching end point (PA1) before a length of the other line (ni+1) exceeds the first or second amplitude of the laser beam.

2. The etching method as claimed in claim 1, wherein the lines of the pattern are etched in the same direction from upstream of the substrate to downstream or vice versa.

3. The etching method as claimed in claim 2, wherein the movement of the beam from the etching end point (PAi) to an etching start point (PDi+1) is obtained by a movement in the scrolling direction and a movement in the direction orthogonal to the scrolling direction.

4. The etching method as claimed in claim 1, wherein the lines of the pattern are alternately etched in a direction from upstream of the substrate to downstream or vice versa.

5. The method for etching a coating on a substrate as claimed in claim 4, wherein the movement of the beam from the etching end point (PAi) to an etching start point (PDi+1) consists in a movement in the direction orthogonal to the scrolling direction, the offset by a distance dx being obtained by scrolling of the substrate.

6. The method as claimed in claim 1, wherein the treatment unit allows each beam to be moved on the surface of the substrate, in the scrolling direction and/or the direction orthogonal to the scrolling direction, at a velocity greater than 1.5 m/s.

7. The method as claimed in claim 1, wherein a ratio of the velocities between the scrolling velocity of movement of the substrate and the first velocity in the scrolling direction and/or the second velocity in the direction orthogonal to the scrolling direction is greater than 10.

8. The method as claimed in claim 1, wherein the first amplitude is greater than 100 mm.

9. The method as claimed in claim 1, wherein the second amplitude is greater than 100 mm.

10. The method as claimed in claim 1, capable of treating a zone of a width greater than 1 m.

11. The etching method as claimed in claim 1, wherein the length of line (ni+1) is the same as the length of the first line and a length of line (ni).

12. A method for etching a coating deposited on a substrate, comprising: obtaining a coated substrate and making it scroll at a scrolling velocity; producing a first pattern (M1) by using the method as claimed in claim 1, the first pattern having the first line of the length between the first etching start point (PD1) and the first etching end point (PA1); and repeating the step of production of a pattern (Mi) so that an etching start point (PDi) of the a first line of a next pattern coincides with an etching end point (PAi) of a first line of a preceding pattern.

13. A method for treating a substrate on which a coating is deposited, said substrate scrolling at a scrolling velocity, the method comprising treating said coating to be etched in the scrolling direction by the method for etching a coating as claimed in claim 12.

14. The method for treating a substrate as claimed in claim 13, wherein said substrate is divided into a plurality of zones each extending over all the length of the substrate in the scrolling direction, the zones being parallel to one another, the coating of each zone being treated in parallel.

15. The method for treating a substrate as claimed in claim 14, wherein the etching in the scrolling direction of several zones uses a treatment unit capable of generating a number of beams equal to the number of zones to be treated and/or the etching in the direction orthogonal to the scrolling direction of several zones uses a treatment unit capable of generating a number of beams equal to the number of zones to be treated.

* * * * *